United States Patent

[11] 3,561,321

| [72] | Inventors | Albert Belshaw<br>Birmingham;<br>Neil W. Patterson, Huntington Woods, Mich. |
|---|---|---|
| [21] | Appl. No. | 827,637 |
| [22] | Filed | May 26, 1969 |
| [45] | Patented | Feb. 9, 1971 |
| [73] | Assignee | Gearcraft, Inc.<br>Hazel Park, Mich.<br>a corporation of Michigan |

[54] GEAR FINISHING MACHINE
16 Claims, 8 Drawing Figs.

[52] U.S. Cl. .................................................. 90/4, 51/95
[51] Int. Cl. .................................................. B23f 5/04, B23f 5/20
[50] Field of Search ..................................... 90/3, 4, 9, 1; 51/95GH

[56] References Cited
UNITED STATES PATENTS

| 1,213,236 | 1/1917 | Natisch | 90/4 |
| 1,603,258 | 10/1926 | Zimmermann | 90/4 |
| 2,472,644 | 6/1949 | Barcus | 90/4 |

Primary Examiner—Gil Weidenfeld
Attorney—Harness, Dickey and Pierce

ABSTRACT: The machine has a base containing a movable bed supporting a rotatable table for the gear to be machined. A fixed stanchion on the base carries a vertically movable slide on which a swivel head is mounted having a slide for supporting a tool spindle for reciprocating movement. A fluid motor on the swivel head slide drives a gear which drives a gear to rotate the spindle and a gear which drives a shaft for rotating the table and for moving the slide on the stanchion driven through two sets of change gears in the conventional manner.

PATENTED FEB 9 1971

INVENTORS.
Albert Belshaw
Neil W. Patterson
BY
Harness, Dickey & Pierce
ATTORNEYS.

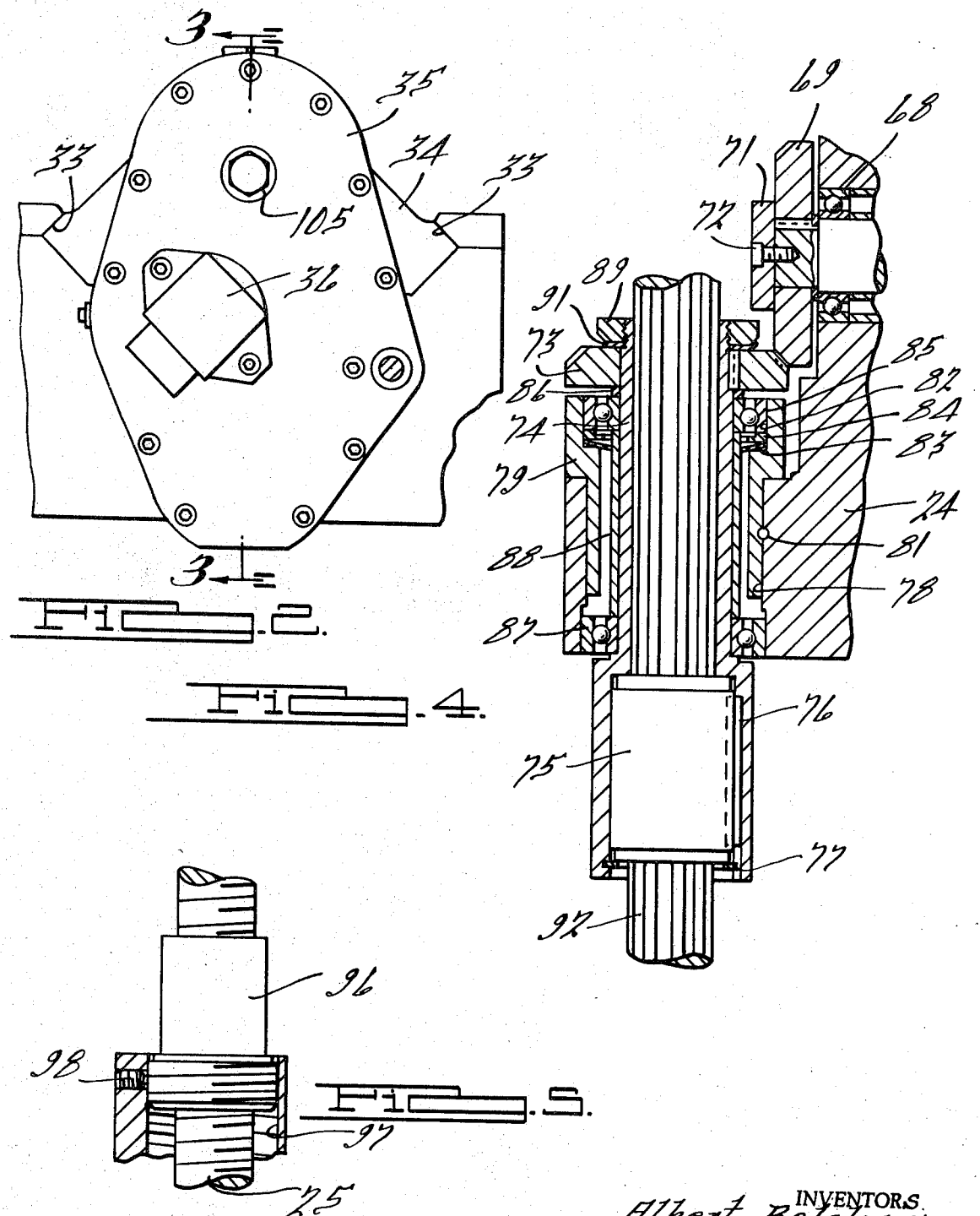

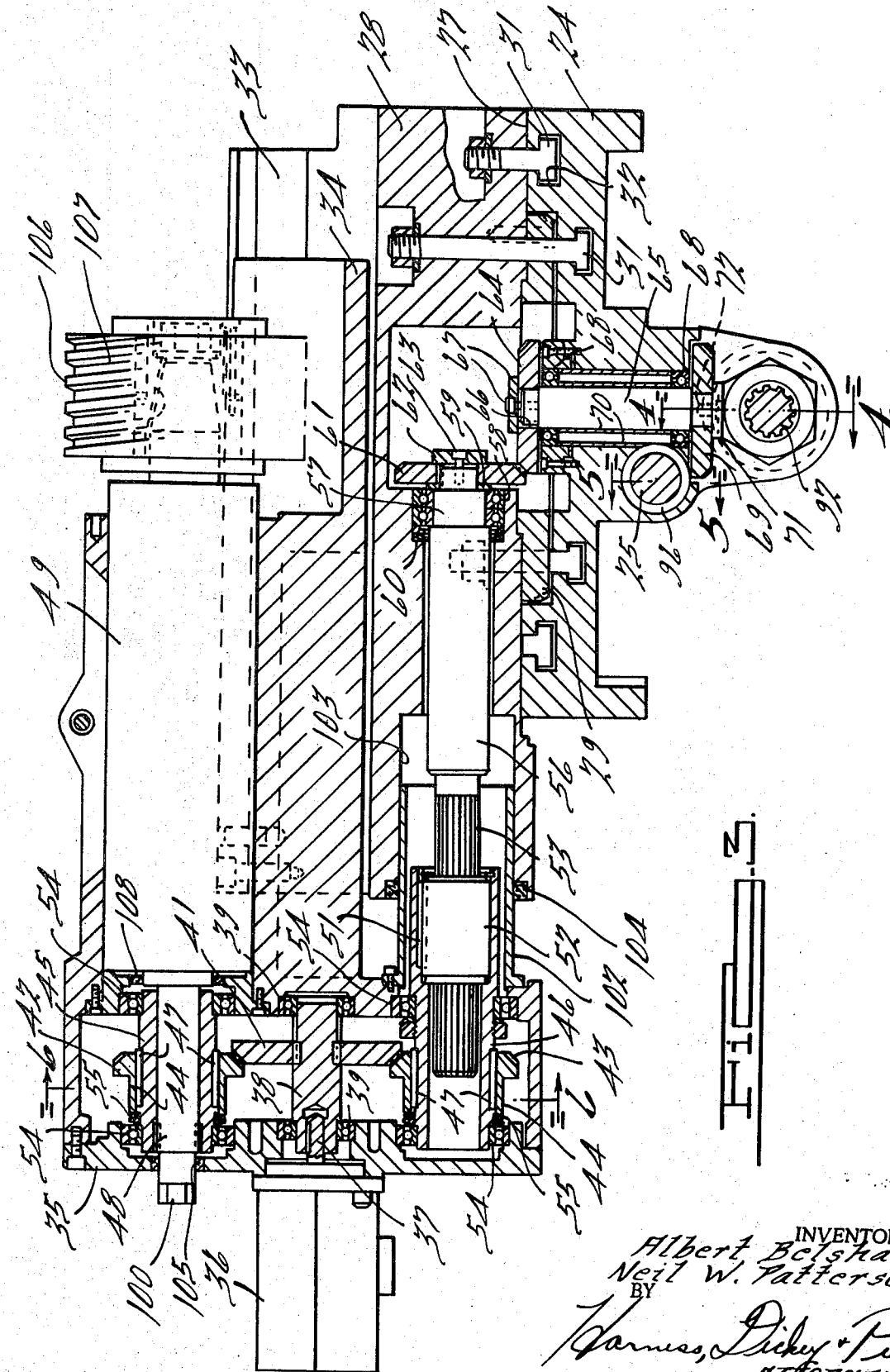

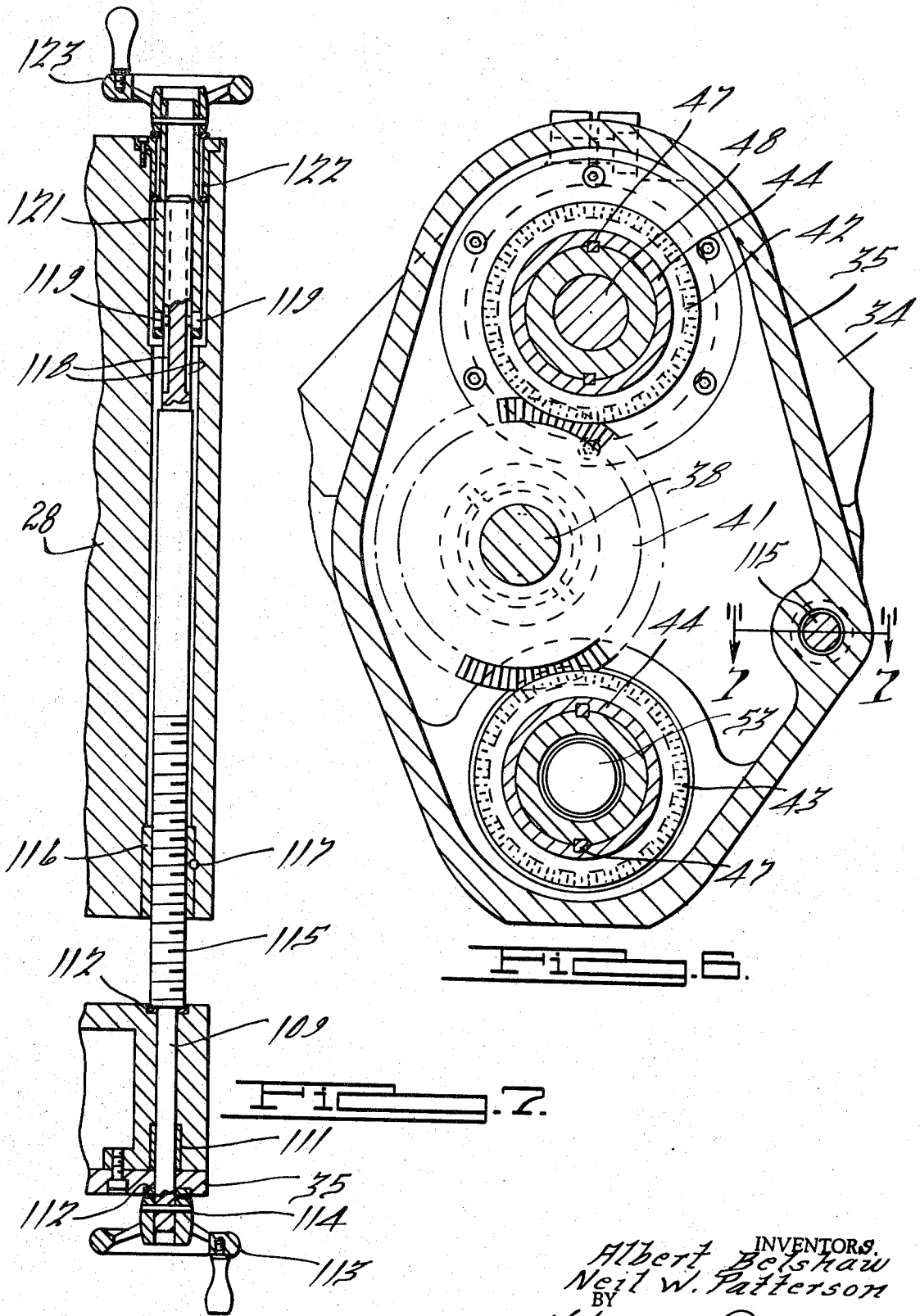

GEAR FINISHING MACHINE

BACKGROUND OF THE INVENTION

Reference may be had to a gear hobbing machine manufactured by the Gould and Eberhardt Division of the Norton Company, Worcester, Mass., for a similar type of machine, the drive in the present machine being entirely different.

SUMMARY OF THE INVENTION

The machine of the present invention was designed primarily for grinding teeth on a gear. It is to be understood that other machine operations could be performed, such as hobbing or roughing the teeth in a blank before the grinding operation. The base of the machine has a stanchion fixed thereto which carries a slide on which a swivel head is mounted having a slide thereon. A variable speed fluid motor is carried on one end of the swivel head which drives a gear for driving a gear on the tool spindle and a gear on a shaft for driving other components of the machine. A bed is mounted on the base for movement toward and away from the stanchion on which a rotatable work supporting table is mounted. The driven shaft drives the table in rotation in exact synchronism with the rotation of the spindle through a set of change gears mounted in the base of the machine. The stanchion slide may be counterweighted and is moved by a lead screw which is also driven from the driven shaft through a set of change gears mounted in the base. A manually operated lead screw in the slide of the swivel head adjusts the spindle axially to locate the machining tool relative to the teeth on a gear to be machined. Antibacklash features are embodied in the driven gears as well as in the nuts for the lead screws and splined shaft and in the various drives. The synchronized drive between the tool and gear is extremely accurate and the profile on the teeth will be machined to accurate form following exactly the lead angle required therefor.

BRIEF DESCRIPTION OF THE DRAWINGS

FIG. 2 is an enlarged broken end view of the swivel head and slide, as viewed from the rear of FIG. 1;

FIG. 3 is a sectional view of the structure illustrated in FIG. 2, taken on the line 3-3 thereof;

FIG. 4 is an enlarged sectional view of the structure illustrated in FIG. 3, taken on the line 4-4 thereof;

FIG. 5 is an enlarged sectional view of the structure illustrated in FIG. 3, taken on the line 5-5 thereof;

FIG. 6 is an enlarged sectional view of the structure illustrated in FIG. 3, taken on the line 6-6 thereof;

FIG. 7 is a broken sectional view of the structure illustrated in FIG. 6, taken on the line 7-7 thereof.

DESCRIPTION OF THE PREFERRED EMBODIMENT

Figure 1:
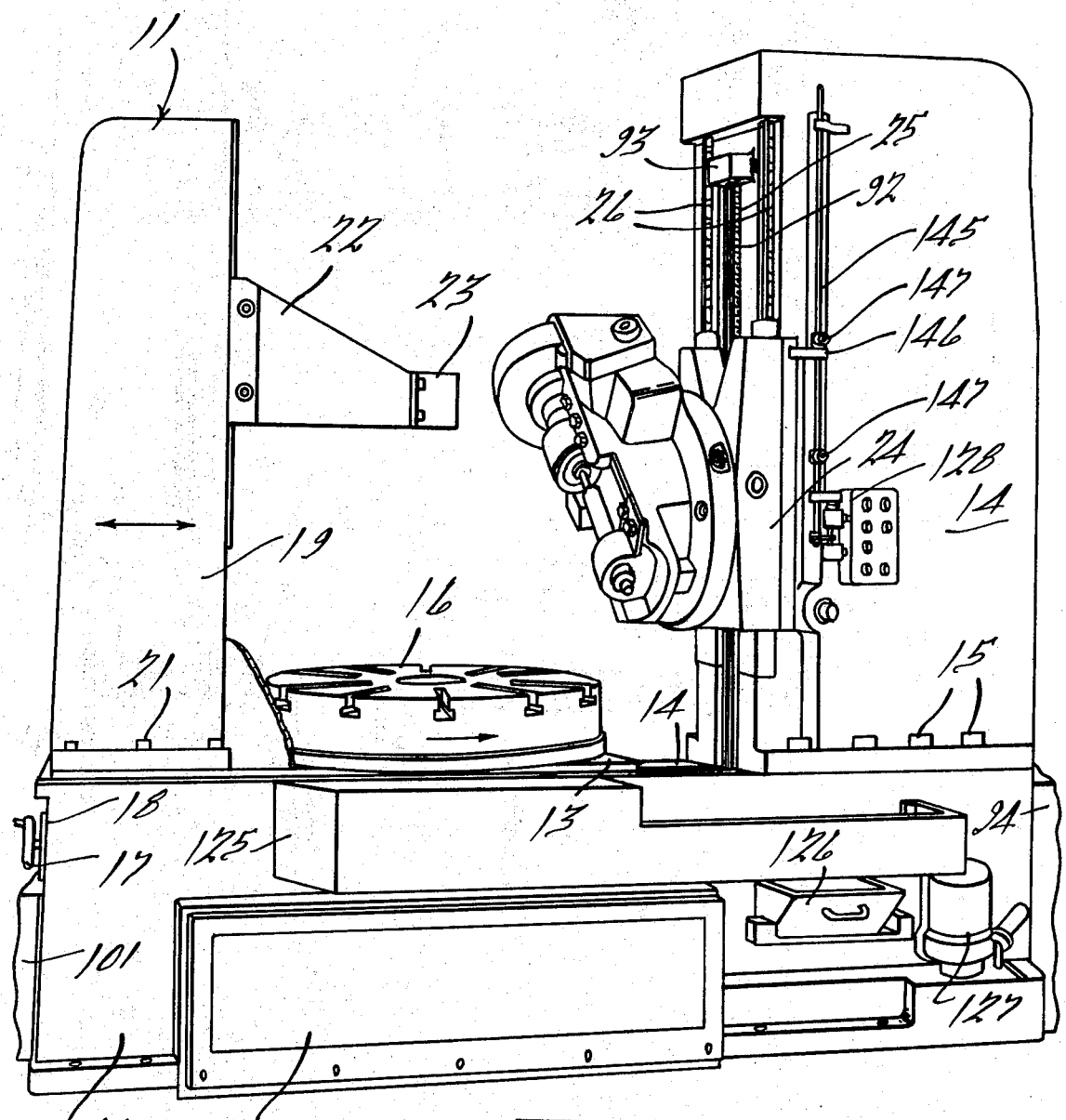
FIG. 1 is a broken view in elevation of a machine having a drive for the elements thereof embodying features of the present invention.

The machine 11 has a base 12 supporting a bed 13 on ways located in the top portion of the base. The base also supports a stanchion 14 which is fixed thereto by a plurality of screws 15. The bed 13 carries a rotatable work supporting table 16 which is advanced or retracted relative to the stanchion 14 by an antibacklash ball nut lead screw which maybe set by a handle 17 which operates a pointer relative to a dial plate 18 to within 0.0005 of an inch. The bed 13 may also carry a column 19 which is fixed thereto by screws 21 having a vertically adjustable arm 22 thereon supporting a member 23 which provides an outboard support for a gear being worked upon. The center of the member 23 is accurately located on the center of the center of the table 16.

A slide 24 is mounted for vertical movement on the stanchion 14 by a ball nut lead screw 25 of the antibacklash type. The slide has one or a pair of chains or cables 26 which extend over pulleys in the stanchion having the opposite ends attached to a weight therein for counterbalancing the slide and the mechanism carried thereby. The slide 24 has a flat face 27 on which an angularly adjustable casting 28 is mounted. The casting 28 has a worm wheel 29 secured thereto engaged by a worm (not shown) on the slide 24 for moving the casting 28 to different angular positions on the face 27 of the slide. T-head bolts 31 extend through the casting 28 with their heads disposed in a pair of spaced annular T-slots 32 in the slide 24 for securing the casting 28 thereto after adjustment. The inner bolts 31 extend through the worm wheel 29 to provide a drive relation with the casting 28.

The casting 28 has oppositely disposed ways 33 for securing a slide 34 thereon for movement longitudinally of its length. As illustrated in FIGS. 2 and 3, the slide 34 carries a head 35 which supports a fluid motor 36 with its shaft 37 keyed to a shaft 38 which is supported on bearings 39 within the head. The shaft 38 has a beveloid gear 41 secured in driving relation thereto the teeth of which mesh with the teeth of beveloid gears 42 and 43 located on opposite sides of the gear 41. The gears 42 and 43 are alike each having a sleeve 44 which is secured in driving relation to sleeves 45 and 46 by keys 47. The sleeve 45 is secured to a stub shaft 48 of a tool carrying spindle mechanism 49. The sleeve 46 is secured by a key 51 to a ball nut 52 of a spline shaft 53. The sleeves 45 and 46 are secured for rotation to the head 35 by bearings 54. The beveloid gears 42 and 43 are urged axially toward the gear 41 by cup-shaped spring washers 55 to assure the elimination of play and backlash from between the ground teeth of the beveloid gears 41, 42 and 43.

The splined shaft 53 has an enlarged forward end 56 containing a shoulder 57 on which a pair of ball bearings 58 are secured by a washer 59, a beveloid gear 61, a washer 62 and a screw 63. A cup-shaped spring washer 60 moves the spline shaft 53 and urges the teeth of the gear 61 into firm engagement with the teeth of a beveloid gear 64 mounted on a stub shaft 65 which forms a center about which the casting 28 is angularly adjusted on the slide 24. The gear 64 is secured to the stub shaft 65 by a key 66 and a washer and screw 67. The stub shaft 65 is rotatably mounted within an aperture in the slide 24 on a pair of ball bearings 68 spaced by sleeves 70. The opposite end of the shaft has a beveloid gear 69 keyed thereto and secured thereon by a washer 71 and screw 72. As illustrated in FIG. 4, the beveloid gear 69 is in engagement with the teeth of a beveloid gear 73 which is secured to a sleeve 74 having a ball nut 75 fixed thereto by a key 76 and a split washer 77.

The slide 24 has an aperture 78 in which a sleeve 79 is secured by a pin 81. The upper end of the sleeve 79 has an aperture 82 supporting a cup-shaped spring washer 83, spacer 84 and a bearing 85. The pressure on the outer race of the bearing 85 is transferred to a washer 86 from the inner race of the bearing to the beveloid gear 73 to urge the teeth thereof into firm operating relation with the teeth of the beveloid gear 69. A bearing 87 engages a shoulder on the sleeve 74 and is spaced from the bearing 85 by a sleeve 88. The sleeve 74 is secured in fixed relation to the slide 24 by a nut 89 and a lock washer 91. The ball nut 75 is mated with a splined shaft 92 which has its upper end journaled in a bearing in a head 93 extending forwardly from the upper end of the stanchion 14. The splined shaft 92 is supported in a bearing 131 in the base 12 and drives a shaft 132 through a pair of spring pressed beveloid gears 133 which drives one of a set of change gears 134 in a change gearbox 94. A shaft 135 is driven by the change gears 134 to drive the lead screw 25 through a pair of spring pressed beveloid gears 136 to drive a ball nut 96 which is threaded in an aperture 97 of the slide 24 and secured in position by a lock screw 98, as illustrated in FIG. 5. The upper end of the lead screw 25 is supported in a bearing within the head 93 of the stanchion 14. The lead screw accurately moves the slide 24 upwardly or downwardly on the ways of the stanchion 14 in synchronism with the rotation of the spindle 49.

The splined shaft 92 also drives a shaft 137 to a change gearbox 101 through a pair of spring pressed beveloid gears 138. A splined shaft 139 is driven through a selected set of change gears 141 for driving a ball nut 142 secured to the bed 13 for rotating a worm thereon having teeth in mesh with the teeth of a worm gear in antibacklash relation therewith for driving the table 16 in rotation. Thespline shaft permits the movement of the bed 13 forwardly and rearwardly while driving the nut and worm fixed thereto for rotating the table in synchronism with the rotation of the spindle 49.

A sleeve 102 is secured to the head 35 about the nut 52 and splined shaft 53 sealed to the wall of an aperture 103 in the casting 28 by a sealing ring 104. A sealing ring 105 seals the shaft 48 to the head 35 and a sealing ring 108 seals the spindle 49 thereto. The seals retain a lubricant within the head about the bearings, gears and other rotatable elements therein. The extending end of the shaft 48 has a hexagon head 100 by which the shaft and the gear train may be turned to check the position of a thread 106 of a tool 107 on the spindle 49 with the teeth of a gear on the table 16.

As illustrated in FIG. 7, the head 35 carries a shaft 109 one end of which is mounted in a sleeve bearing 111 retained against axial movement by thrust washers 112. The extending end of the shaft has a handle 113 secured thereto by a pin 114. The shaft has a thread 115 which is in engagement with the thread of a sleeve 116 which is secured to the casting 28 by a pin 117. The opposite end of the shaft has a pair of diametrically located slots 118 engaged by keys 119 secured to a sleeve 121 supported in a bearing 122 in the casting 28. The end of the shaft 109 extending from the bearing 122 has a handle 123 fixed thereto. Upon rotation of the handle 113 or 123, the slide 34 and head 35 are advanced or retracted on the casting 28 to locate the tool 107 relative to the gear or blank mounted on the table 16.

The base 12 has a cover plate 124 which is removable to provide access to the driving elements within the base. A trough 125 is mounted on the base above the plate 124 for receiving the coolant, the cuttings in which are collected in a pan 126. A motor 127 drives a coolant pump to supply coolant to the teeth of the tool and gear being machined which is returned to a tank within the base for recirculation.

The hydraulic motor 36 is of a type procurable from DeLaval and is of approximately 10 horsepower for the size of the machine herein illustrated any and may be operated clockwise or counterclockwise. The motor drives the beveloid gear 41 to drive the beveloid gears 42 and 43 at the same speed. The gear 43 drives the gear 61 which drives the like gears 64 and 69 to drive the gear 73 which is the same as the gear 69 so the the splined shaft 92 will be driven at the same speed as the splined shaft 53. This driving will occur without any play in view of the pressure between the teeth produced by the cup-shaped washers. The gear 42 drives the spindle 49 which is of the standard type procurable in the trade from the Pope Machine Company having an outer sleeve containing suitable bearings for supporting the spindle for precision operation.

The precision ball nut 96 and lead screw 25 and the precision ball nut 52 and spline shaft 53 and the others which are employed on the machine for preventing any play and backlash are procurable in the trade from Beaver precision Manufacturing Company. In all instances, the play and backlash is removed from the precision beveloid gears and the precision drives through the ball nut, lead screws and splined shafts. The tool 107 and the gear on the table 16 are very accurately driven in synchronism relative to each other, the relative speed for different size gears and tools is controlled by the change gears in the change gear housing 101. The bed 13 may be advanced or retracted by turning the handle 17, the change in position being indicated by the position of the pointer on the dial 18 and thereby to obtain accurate depth relationship between the teeth of the gear and tool. The hexagon head 100 on the shaft 48 may be rotated to check the thread or teeth of the tool relative to the teeth of the gear. The slide 24 is precisely driven upwardly or downwardly on the stanchion 14 by the spline shaft 25 operating in the precision ball nut 96. This provides an up or down feed to the tool as it is rotated in synchronism with the gear.

Figure 8:
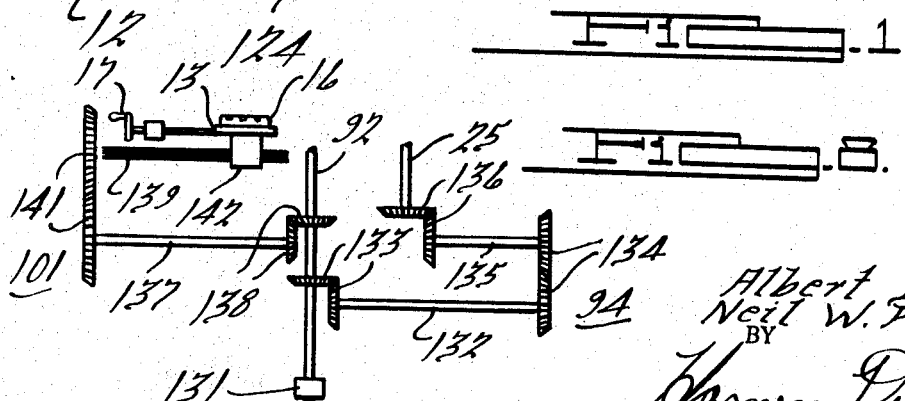
FIG. 8 is a schematic view of the portion of the drive mounted in the base of the machine.

A rod 145 on the side of the stanchion 14 is actuated by a finger 146 on the slide 24 operating between stops 147 on the rod to limit the up and down movement of the slide as the rod actuates elements in a manual control box 128 by which the operation of the machine is manually controlled in the usual manner. By employing a hydraulic motor and the beveloid gears, the drive is substantially simplified and the use of the precision ball nuts and associated splined shafts and lead screws eliminates all backlash in the driving elements and assures exact and precise machining of the hear teeth. While the gears 134 and 141 in the gearboxes 101 and 94 are shown in FIG. 8 as of the spring pressed beveloid type, it is to be understood that standard types of change gears could be employed as the forward drive therethrough to eliminate any backlash during the machining operation.

We claim:

1. In a machine for accurately machining teeth on a gear, a carrier member, a slide movably mounted on said carrier member, a variable speed motor mounted on said slide, a gear on said slide driven by said motor, a tool spindle carried by said slide, a first gear having its teeth in mesh with the teeth of said motor driven gear mounted on said spindle, a splined shaft on said slide and carrier member, second gear having teeth in mesh with the teeth of said motor driven gear, mounted on said splined shaft and being movable relative thereto whereby when said slide is moved relative to said carrier member, the teeth on the gear on the spline shaft and those on the motor driven gear will remain in mesh, means supporting the gear to be machined for rotation, and drive means from said spline shaft for rotating said supporting means in synchronism with the rotation of said spindle by said motor driven gear.

2. In a machine as recited in claim 1, wherein said motor is driven by hydraulic fluid.

3. In a machine as recited in claim 1, wherein said carrier is mounted for angular adjustment on a support, and a stanchion to which said support is secured.

4. In a machine as recited in claim 3, wherein said stanchion is mounted on a base, a bed mounted on said base for reciprocal movement toward and away from said spindle, said support means including a rotatable table mounted on said bed, and said drive means from said splined shaft rotating said table in synchronism with said spindle.

5. In a machine as recited in claim 4, wherein said support is a slide mounted for movement upwardly and downwardly on said stanchion, and a drive from said splined shaft for moving said stanchion slide in synchronism with the rotation of said table and spindle.

6. In a machine as recited in claim 5, wherein a stub shaft extends through said carrier member and stanchion slide about which said carrier member is angularly adjusted, said stub shaft being included in the from said splined shaft to said table and stanchion slide.

7. In a machine for accurately machining teeth on a gear, a base, a stanchion on said base, a support on said stanchion, an angularly adjustable member on said support, a head slidably mounted on said member, a stub shaft extending through said member and support forming a center about which said member is angularly adjusted, a tool spindle in said head, a hydraulically driven motor on said head, a drive shaft on said head driven by said motor, a splined shaft on said member, a gear for driving said spindle, a gear for driving said splined shaft, means supporting said gear to be machined for rotation, drive means from said spline shaft for rotating said supporting means, a gear on said drive shaft having teeth in mesh with the teeth on said splined shaft and said spindle driving gears for driving said spindle and said splined shaft in synchronism, and said gear for driving said splined shaft being movable relative thereto, whereby said head can move relative to said member and the gears on the drive shaft and the splined shaft will remain in mesh.

8. In a machine as recited in claim 7, wherein the support on said stanchion is a slide movable upwardly and downwardly thereon.

9. In a machine as recited in claim 8, wherein a spline nut engages said splined shaft, and a sleeve journaled in said head and secured to said nut and to the gear for driving said splined shaft for driving said splined shaft in rotation in different positions of said head.

10. In a machine as recited in claim 9, wherein said motor, spindle and gears are carried by said slidable head all of which are movable as a unit relative to said splined shaft.

11. In a machine as recited in claim 10, wherein a bed is adjustably supported on said base, said supporting means including a table on said bed driven in rotation by a gear train from said splined shaft in synchronized relation with the driving of said spindle.

12. In a machine as recited in claim 11, wherein the gears are of the beveloid type, and means for urging one of the mated gears toward the other for eliminating backlash between the teeth thereof.

13. In a machine as recited in claim 12, wherein a spline nut is carried by said stanchion slide, a splined shaft in engagement with said spline nut, a gear on said spline nut, gears on the ends of a stub shaft one of which has teeth in engagement with the teeth of the gear on the nut, and a gear on said first splined shaft having teeth in mesh with the teeth of the gear at the other end of the stub shaft.

14. In a machine as recited in claim 13, wherein a second nut is carried by said stanchion slide, and a lead screw in engagement with said second nut for moving said slide on said stanchion in synchronism with the driving of said spindle.

15. In a machine as recited in claim 14, wherein manually operable means are provided for slidably moving the head on said member for positioning the spindle relative to said table.

16. In a machine as recited in claim 15, wherein means are provided by which the spindle may be rotated manually for checking the relationship between the gear to be machined and a tool on the spindle.